(12) United States Patent
Nagami et al.

(10) Patent No.: US 10,730,212 B2
(45) Date of Patent: Aug. 4, 2020

(54) OPENING/CLOSING DEVICE, MOLDING APPARATUS, AND MOLDING METHOD

(71) Applicant: Toshiba Kikai Kabushiki Kaisha, Tokyo-to (JP)

(72) Inventors: Takeshi Nagami, Numazu (JP); Takeshi Iida, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 278 days.

(21) Appl. No.: 15/528,323

(22) PCT Filed: Nov. 17, 2015

(86) PCT No.: PCT/JP2015/082205
§ 371 (c)(1),
(2) Date: May 19, 2017

(87) PCT Pub. No.: WO2016/080376
PCT Pub. Date: May 26, 2016

(65) Prior Publication Data
US 2017/0312952 A1 Nov. 2, 2017

(30) Foreign Application Priority Data
Nov. 20, 2014 (JP) .................. 2014-235577

(51) Int. Cl.
*B29C 44/42* (2006.01)
*B29C 45/76* (2006.01)
(Continued)

(52) U.S. Cl.
CPC .......... *B29C 44/425* (2013.01); *B22D 17/263* (2013.01); *B29C 45/76* (2013.01);
(Continued)

(58) Field of Classification Search
CPC ..... B29C 44/425; B29C 45/76; B29C 45/661; B29C 45/7653; B29C 2945/76598;
(Continued)

(56) References Cited

U.S. PATENT DOCUMENTS 5,238,383 A * 8/1993 Bannai .................... B29C 45/82
264/40.5
5,843,496 A * 12/1998 Ito ......................... B29C 45/661
425/589
(Continued)

FOREIGN PATENT DOCUMENTS

| CN | 101104299 | 1/2008 |
| CN | 102756465 | 10/2012 |

(Continued)

OTHER PUBLICATIONS

German Office Action in Application No. 11 2015 005 268.2 dated Feb. 1, 2019.
(Continued)

*Primary Examiner* — Michael N Orlando
*Assistant Examiner* — Abhishek A Patwardhan
(74) *Attorney, Agent, or Firm* — DLA Piper LLP (US)

(57) ABSTRACT

An opening/closing device (14) includes: a stationary platen (20); a movable platen (22) capable of moving toward or away from the stationary platen (20); an opening/closing mechanism (28) having a plurality of toggle links (30, 31, 32) at least one (32) of which is connected to the movable platen (22); a driving device (37) including a cross head (26) connected to at least one (30) of the toggle links and capable of moving the movable platen (22); and a control portion (50). The control portion (50) is configured to control the cross head (26) such that the movable platen (22) moves at fixed speed during fine die-opening operation.

8 Claims, 4 Drawing Sheets

(51) Int. Cl.
  *B22D 17/26* (2006.01)
  *B29C 45/66* (2006.01)
  *B29K 105/04* (2006.01)
(52) U.S. Cl.
  CPC ........ *B29C 45/661* (2013.01); *B29C 45/7653* (2013.01); *B29C 2945/76598* (2013.01); *B29C 2945/76709* (2013.01); *B29C 2945/76869* (2013.01); *B29C 2945/76872* (2013.01); *B29K 2105/04* (2013.01)
(58) Field of Classification Search
  CPC ........... B29C 2945/76709; B29C 2945/76869; B29C 2945/76872; B22D 17/263; B29K 2105/04
  USPC .......................................................... 264/41
  See application file for complete search history.

(56) References Cited

U.S. PATENT DOCUMENTS

| | | | | |
|---|---|---|---|---|
| 7,717,159 | B2* | 5/2010 | Tsuji | B22D 17/263 164/312 |
| 7,775,258 | B2* | 8/2010 | Yashiro | B22D 17/2084 164/131 |
| 2002/0140119 | A1* | 10/2002 | Hofmann | B29C 45/76 264/40.1 |
| 2010/0112113 | A1 | 5/2010 | Tobita et al. | |
| 2011/0285046 | A1 | 11/2011 | Koike et al. | |
| 2015/0321401 | A1* | 11/2015 | Schad | B29C 45/1756 264/39 |

FOREIGN PATENT DOCUMENTS

| | | |
|---|---|---|
| DE | 101 15 253 | 10/2002 |
| JP | 63-112136 | 5/1988 |
| JP | 08-309779 | 11/1996 |
| JP | 08309779 A * | 11/1996 |
| JP | 2002-321262 | 11/2002 |
| JP | 2007-054993 | 3/2007 |
| JP | 2010-111021 | 5/2010 |
| JP | 2011-218708 | 11/2011 |
| JP | 2011-240603 | 12/2011 |
| JP | 2012-228822 | 11/2012 |
| JP | 2014-131836 | 7/2014 |
| WO | WO 2003-072335 | 9/2003 |

OTHER PUBLICATIONS

International Search Report (with English Translation) issued in PCT/JP2015/082205 dated Feb. 9, 2016.
Written Opinion (with English Translation) issued in PCT/JP2015/082205 dated Feb. 9, 2016.
International Preliminary Report on Patentability issued in PCT/JP2015/082205 dated May 23, 2017.
English Language Abstract of JP 08-309779 issued Nov. 26, 1996.
English Language Abstract of JP 2011-240603 issued Dec. 1, 2011.
English Language Abstract of JP 63-112136 issued May 17, 1988.
English Language Abstract of JP 2010-111021 issued May 20, 2010.
English Language Abstract of JP 2012-228822 issued Nov. 22, 2012.
English Language Abstract of JP 2014-131836 issued Jul. 17, 2014.
Chinese Office Action issued in CN 201500631251 dated Aug. 27, 2018.

* cited by examiner

OPENING/CLOSING DEVICE, MOLDING APPARATUS, AND MOLDING METHOD

CROSS REFERENCE TO RELATED APPLICATIONS

This application is a U.S. National Stage Application of International Application No. PCT/JP2015/082205 filed Nov. 17, 2015, which claims priority from Japanese Patent Application No. 2014-235577 filed Nov. 20, 2014. The entirety of all the above-listed applications are incorporated herein by reference.

TECHNICAL FIELD

The present invention relates to an opening/closing device, a molding apparatus, and a molding method.

BACKGROUND ART

Conventionally, as one of the molding methods using an injection molding machine, there has been widely performed foam molding in which resin undergoes foaming to be formed into a molding. Various characteristics can be added to the foam molding prepared by this foam molding, such as light weight, thermal insulation property, and acoustic absorption.

As is known, in foam molding, the die cavity is filled with molten resin containing foaming agent, and after the surface layer of the molten resin has been solidified into a skin layer, a core back operation is performed with respect to the die in order to foam the resin (See, for example, Patent Document 1).

Further, according to the disclosure of Patent Document 1, in the core back operation in foam molding using a toggle type die clamping device, a movable platen is controlled with ten times the accuracy with which the position of a cross head is controlled.

PRIOR ART DOCUMENT

Patent Document

Patent Document 1: PCT Patent Publication No. WO2003/072335

SUMMARY OF THE INVENTION

Regarding the toggle type die clamping device described in Patent Document 1, there is no disclosure on the control of the speed of the movable platen. Thus, there is a fear of the speed of the movable platen being varied during the core back operation; thus, the prior-art technique has a problem in that the fine foaming amount of the molding is not uniform, resulting in deterioration in the quality of the molding.

The present invention has been made in view of the above problem. It is an object of the present invention to provide an opening/closing device, a molding apparatus, and a molding method in which the movable platen moves at a fixed speed during the core back operation.

DISCLOSURE OF THE INVENTION

According to the present invention, there is provided an opening/closing device including: a stationary platen; a movable platen capable of moving toward or away from the stationary platen; an opening/closing mechanism having a plurality of toggle links at least one of which is connected to the movable platen; a driving device including a cross head connected to at least one of the toggle links and capable of moving the movable platen; and a control portion configured to control the cross head such that the movable platen moves at a fixed speed during fine die-opening operation.

In the opening/closing device of the present invention, the movement distance through which the cross head moves at the time of fine die-opening operation is divided into a plurality of sections, and the speed of the cross head is previously determined for each of the plurality of sections such that the movable platen moves at a fixed speed; at the time of fine die-opening operation, the control portion may move the cross head at a speed determined beforehand for each section.

Further, according to the present invention, there is provided a molding apparatus including the opening/closing device as described above.

Further, according to the present invention, there is provided a molding method employing the opening/closing device as described above and including a step in which, at the time of fine die-opening operation, the cross head is moved such that the movable platen moves at a fixed speed.

According to the present invention, at the time of core back operation, the movable platen moves at a fixed speed, whereby it is possible to make the fine foaming amount of the molding uniform. This helps to achieve an improvement in terms of the quality of the molding.

MODES FOR CARRYING OUT THE INVENTION

Figure 1:
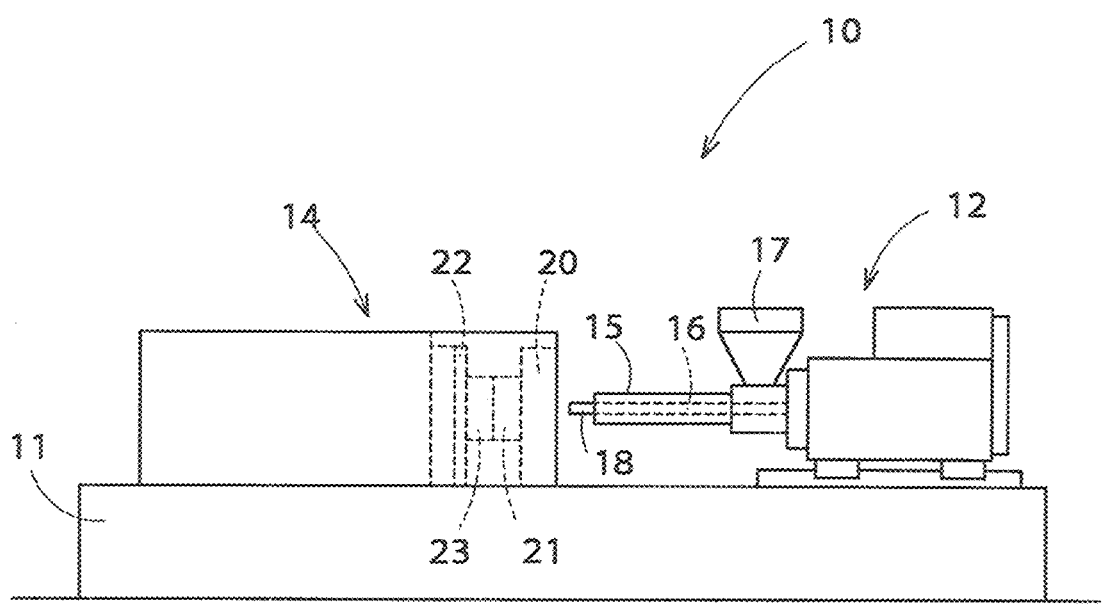
FIG. 1 is a schematic side view of an injection molding machine to which a toggle type die clamping device according to the present invention is applied.

In the following, a toggle type die clamping device of an injection molding machine according to an embodiment of the present invention will be described with reference to the drawings. FIG. 1 is a diagram illustrating the outline of the construction of an injection molding machine (molding apparatus) 10 to which a toggle type die clamping device according to an embodiment of the present invention is applied. In FIG. 1, reference numeral 12 indicates the injection device of the injection molding machine as a whole. Reference numeral 14 indicates the toggle type die clamping device (die clamping device, die opening/closing device, opening/closing device) of the injection molding machine.

In FIG. 1, a screw 16 is inserted into a barrel 15 of the injection device 12 so as to be rotatable and movable in the axial direction. Resin (molding material, material) is charged into the barrel 15 from a hopper 17. Around the barrel 15, there is arranged a heater (not shown) for heating the barrel 15. In the injection device 12, the screw 16 is rotated by a measurement motor (not shown), and the resin is accumulated in the front portion of the barrel 15 while being melted and kneaded, whereby measurement is performed. By causing the screw 16 to advance by an injection motor, ball screw, and nut (not shown), the resin accumulated in the front portion of the barrel 15 is charged from a nozzle 18 into a cavity formed by a stationary die 21 and a movable die 23.

Next, the toggle type die clamping device 14 will be described with reference to FIG. 2. The toggle type die clamping device 14 comprises, for example, with a stationary die plate (stationary platen) 20 fixed to a frame 11, a rear plate (pressure receiving platen) 24 installed on the frame 11, and a movable die plate (movable platen) 22 installed so as to be movable between the stationary die plate 20 and the rear plate 24 and movable toward and away from the stationary die plate (stationary platen) 20.

A stationary die 21 is mounted to the stationary die plate 20, and a movable die 23 is mounted to the movable die plate 22 so as to be opposite the stationary die 21.

The stationary die plate 20 and the rear plate 24 are connected to each other via a plurality of (e.g., four) tie bars 36. When the dies are clamped (when die clamping is performed), the tie bars 36 receive a die clamping force generated by a toggle mechanism (opening/closing mechanism, the opening/closing mechanism, die clamping mechanism) 28 described below.

Figure 2:
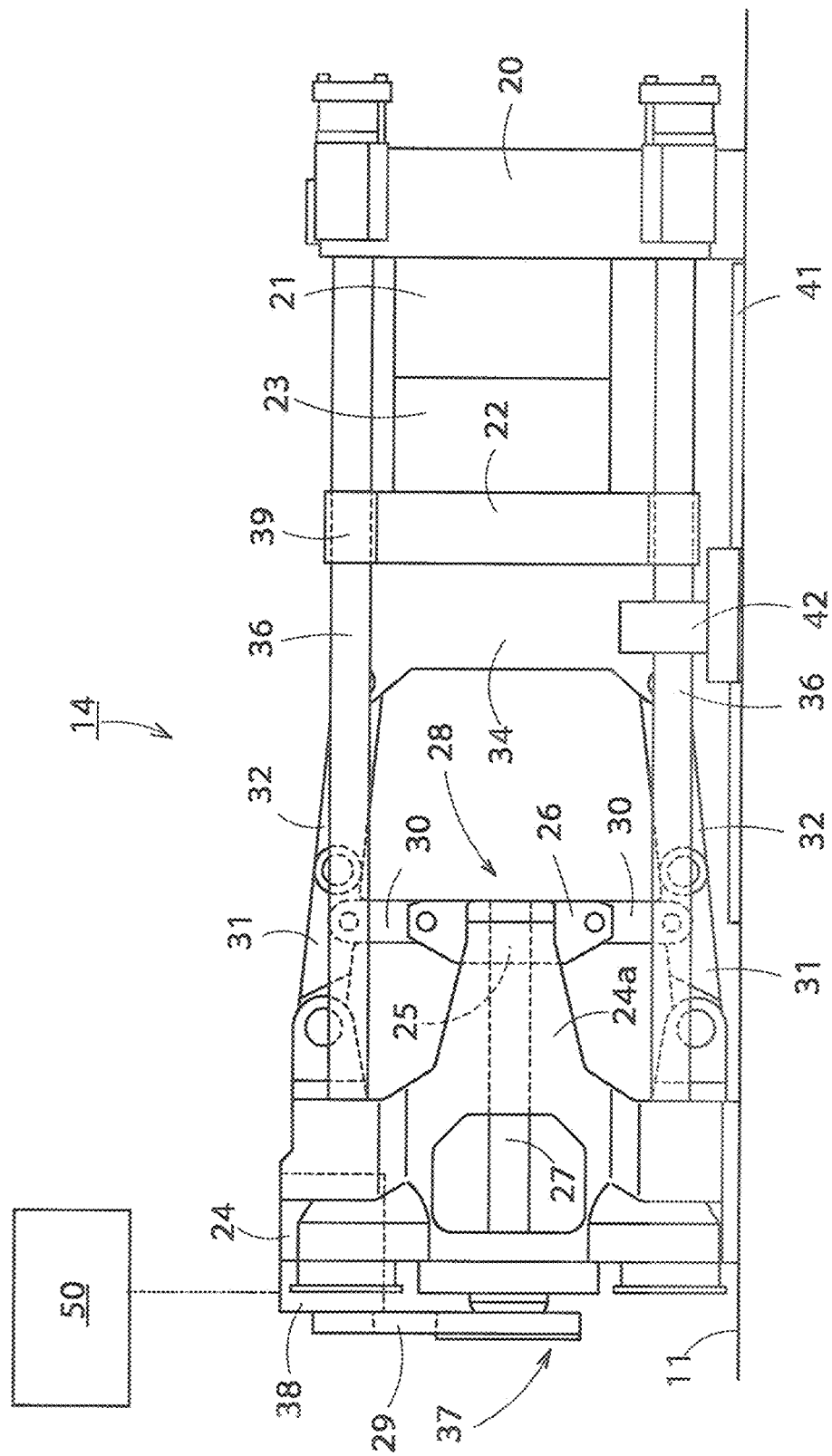
FIG. 2 is a side view of a toggle type die clamping device of an injection molding machine according to an embodiment of the present invention.

In FIG. 2, reference numeral 26 indicates a cross head. At the central portion of this cross head 26, there is provided a nut portion 25 of a driving device 37 for driving the toggle mechanism 28 A ball screw 27 is threadedly engaged with this nut portion 25. A guide (not shown) guiding the movement in the front-rear direction of the cross head 26 is supported by an arm portion 24a of the rear plate 24. The ball screw 27 is driven by an electric motor (servo motor) 38 via a timing belt 29. As a result, the nut portion 25 and the cross head 26 move linearly along the longitudinal direction of the bail screw 27.

In the present embodiment, the driving device 37 is a mechanism for moving, for example, the cross head 26, and is composed of the nut portion 25, the ball screw 27, the timing belt 29 and the electric motor 38.

The rear plate 24 and the movable die plate 22 are connected to each other by the toggle mechanism 28. The toggle mechanism 28 has toggle links 30, 31 and 32 on both of the upper and lower sides thereof. Of these, one end of each toggle link 30 is connected to the cross head 26, and one end of each toggle link 31 is connected to the rear plate 24. Further, end of each toggle link 32 is connected to the movable die plate 22 via a toggle link connection portion 34.

Due to this toggle mechanism 28, the movable die plate 22 moves to open and dose the die; further, the die damping force is transmitted. That is, through driving, the driving device 37 can move (is capable of moving) the die plate 22 via the toggle mechanism 28.

When die dosing or die clamping is performed by the toggle mechanism 28, the cross head 26 is caused to advance by the driving device 37 to thereby expand the toggle mechanism 28 That is, through the driving of the electric motor 38, the ball screw 27 is rotated in a predetermined direction via the timing belt 29, whereby the nut portion 25 and the cross head 26 advance in the direction of the stationary die plate 20. At this time, the toggle links 31 and 32 on the upper side open upwardly, and the toggle links 31 and 32 on the lower side open downwardly, with the movement of the cross head 26 being transmitted to the movable die plate 22 via the toggle mechanism 28 to effect die closing or die clamping on the stationary die 21 and the movable die 23.

Conversely, when die opening is performed on the stationary die 21 and the movable die 23, the cross head 26 is caused to retreat by the driving device 37 to bend the toggle mechanism 28. That is, through the driving of the electric motor 38, the ball screw 27 is rotated in a direction opposite to that at the time of die closing via the timing belt 29, whereby the nut portion 25 and the cross head 26 retreat in the direction of the rear plate 24. By causing the nut portion 25 to retreat in the direction of the rear plate 24, the toggle links 31 and 32 on the upper side are closed downwardly, and the toggle links 31 and 32 on the lower side are closed upwardly, thereby effecting die opening on the stationary die 21 and the movable die 23.

In this way, in the present embodiment, the structure is such that: in the state in which the die dosing or die clamping has been completed, the toggle links 31 and 32 become substantially linear; at the time of die opening, the toggle links 31 and 32 are bent toward the axis of the ball screw 27, that is, bent so as to be enfolded inwardly.

In order to guide the movable die plate 22, the tie bars 36 are passed through the four corners of the movable die plate 22 through the intermediation of bushes 39. Further, in order to guide the movable die plate 22, there are laid, on both the right and left sides of the base 11, linear guide rails 41 so as to be parallel to the tie bars 36, and linear guides 42 slidable on the linear guide rails 41 are mounted to both the right and left side surfaces of the toggle link connection portion 34.

The driving device 37 is connected to an injection molding machine controller (control device, control portion) 50. The injection molding machine controller 50 may include, for example, a computer having a central processing unit (CPU), read only memory (ROM), random access memory (RAM), external storage device, etc. This injection molding machine controller 50 controls the injection device 12, the toggle type die clamping device 14, etc. based on various items of information input. In this case, the control portion 50 is configured to control the injection molding machine 10 as a whole; In the present invention, however, the control portion may be configured to control at least the driving device 37.

The toggle type die damping device of the injection molding machine according to the present embodiment is constructed as described above. Next, the function and effect of the driving device 37 will be described in connection with foam molding.

The toggle type die clamping device 14 is a toggle link type die clamping device in which the movement of the movable die plate 22 for the die dosing and die opening, and the die damping are effected by the toggle mechanism 28.

Figure 3:
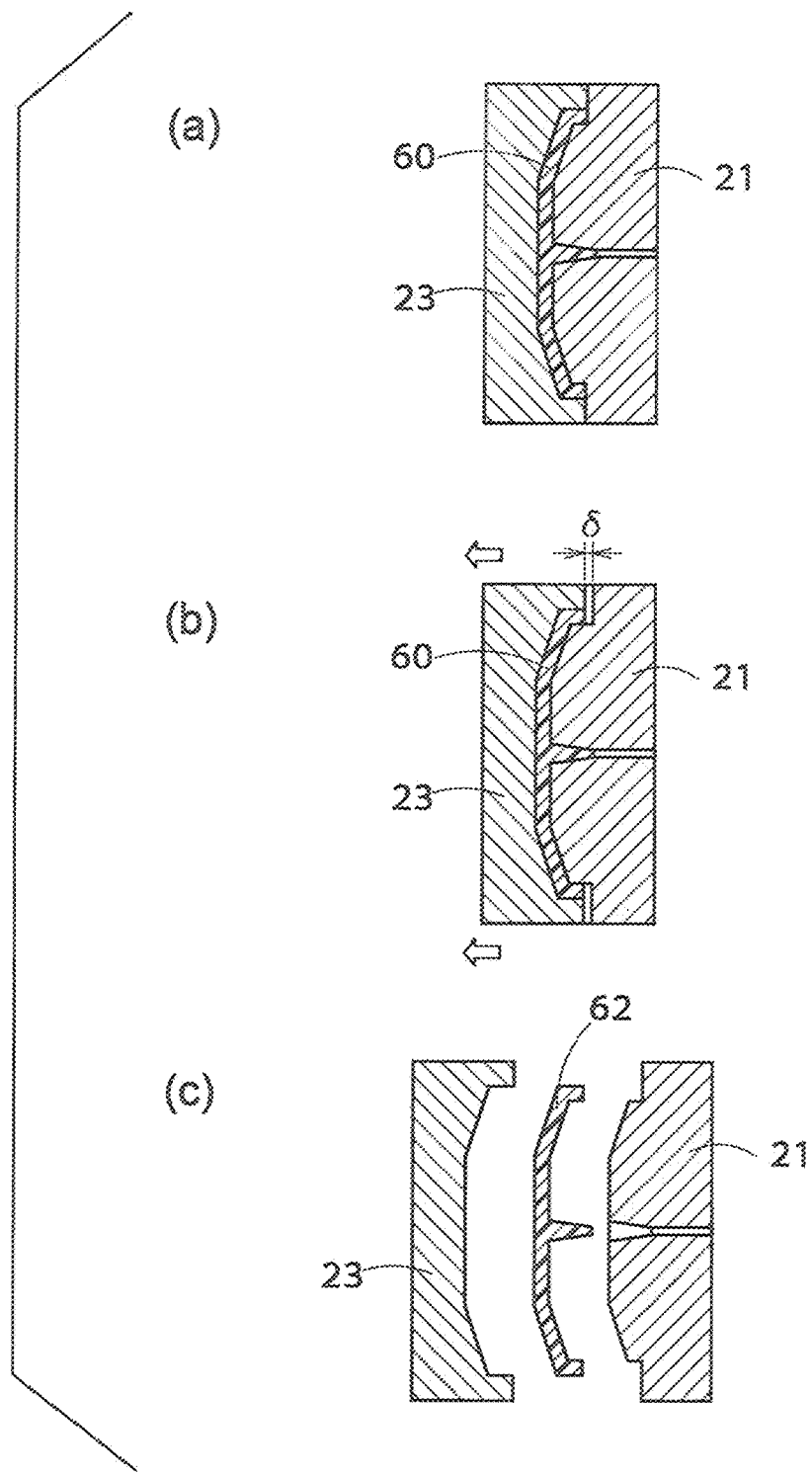
FIG. 3 is an explanatory view illustrating a foam molding process.

In this toggle type die clamping device 14, in the case where foam molding is executed as shown in FIG. 3, a cavity 60 formed by the stationary die 21 and the movable die 23 is first filled with a molten resin containing foaming agent, and the surface layer of the molten resin is solidified to form a skin layer (FIG. 3(a)). After this, the movable die 23 is slightly opened by a predetermined movement amount (core back operation is performed), whereby the resin undergoes foaming (FIG. 3(b)). After the foaming, the resin is cooled, and then die is opened by causing the movable die 23 to retreat to extract a molding 62 (FIG. 3(c)).

In the toggle type die damping device 14 according to the present embodiment, when core back operation (fine die-opening operation) is performed, the movable die plate 22 is moved in the die-opening direction, and, at the same time, the movement amount of the movable die plate 22 is obtained by, for example, an encoder (detector) (not shown) provided on the motor 38 and by an injection molding machine controller 50. When the movement amount of the movable die plate 22 attains a pre-set movement amount (fine opening amount), the movement of the movable die plate 22 is stopped.

In the present embodiment, the injection molding machine controller 50 controls the driving device 37, whereby, at the time of the core back operation of the die, the cross head 26 is controlled such that the movable die plate 22 moves at a fixed speed. In the present specification, the expression: "moves at a fixed speed" includes not only the case where the moving speed is completely fixed but also the case where the moving speed is approximately fixed.

In the toggle type die clamping device 14, the toggle mechanism 28 is provided in between, so that even in the case where the cross head 26 is moved at a fixed speed, the movable die plate 22 does not always move at a fixed speed. Thus, by previously acquiring the relationship between the position of the movable die plate 22 and the position of the cross head 26, it is possible to move the cross head 26 such that the movable die plate 22 moves at a fixed speed.

More specifically, by controlling the electric motor 38, the injection molding machine controller 50 controls the rotation amount of the ball screw 27 via the timing belt 29. As a result, the nut portion 25 threadedly engaged with the ball screw 27 and the cross head 26 are moved. At this time, the cross head 26 is controlled such that the movable die plate 22 moves at a fixed speed.

The injection molding machine controller 50 may control the cross head 26, for example, in the following manner.

First, the movement distance through which the cross head 26 moves at the time of the core back operation is previously divided into a plurality of sections. This movement distance corresponds to the movement distance of the cross head 26 when the movable die plate 22 moves by the above-mentioned movement amount (fine opening amount) at the time of the core back operation.

Next, with respect to each of the plurality of sections, the speed of the cross head 26 is previously calculated and determined such that the movable die plate 22 moves at a fixed speed. For example, in the case where the movement distance of the cross head 26 is divided into n sections, the speed of the cross head 26 is determined with respect to each of these n sections. Information on the plurality of sections and information on the speed of the cross head 26 for each section are calculated from the value of the movement amount of the movable die plate 22 set, for example, by the operator, and are stored in the injection molding machine controller 50.

At the time of the core back operation of the die, the injection molding machine controller 50 performs control so as to move the cross head 26 at a speed previously determined for each section. For example, in the case where the movement distance of the cross head 26 is divided into n sections, in the first section, the cross head 26 is moved at a speed corresponding to the first section, and, in the second section, the cross head 26 is moved at a speed corresponding to the second section. In this way, the cross head 26 is caused to be moved while successively varying the moving speed of the cross head 26 such that the movable die plate 22 moves at a fixed speed. In the last or nth section, the cross head 26 is moved at a speed corresponding to the nth section, and then the cross head 26 is stopped. At this time, the movable die plate 22 stops at a position where it has moved by a predetermined movement amount (fine opening amount).

It is not always necessary for the above-mentioned plurality of sections to be of the same width. In particular, at the die closing side position (lock-up side position), the variation in the speed of the cross head 26 is augmented when control is performed such that the movable die plate 22 moves at a fixed speed. Thus, in order to make the moving speed of the movable die plate 22 more uniform, it is desirable for the section of the die closing side position (lock-up side position) to be divided into a section finer than the section of the die opening side position.

In the following, the movement of the cross head 26 at the time of the core back operation will be described based on a specific embodiment.

Figure 4:
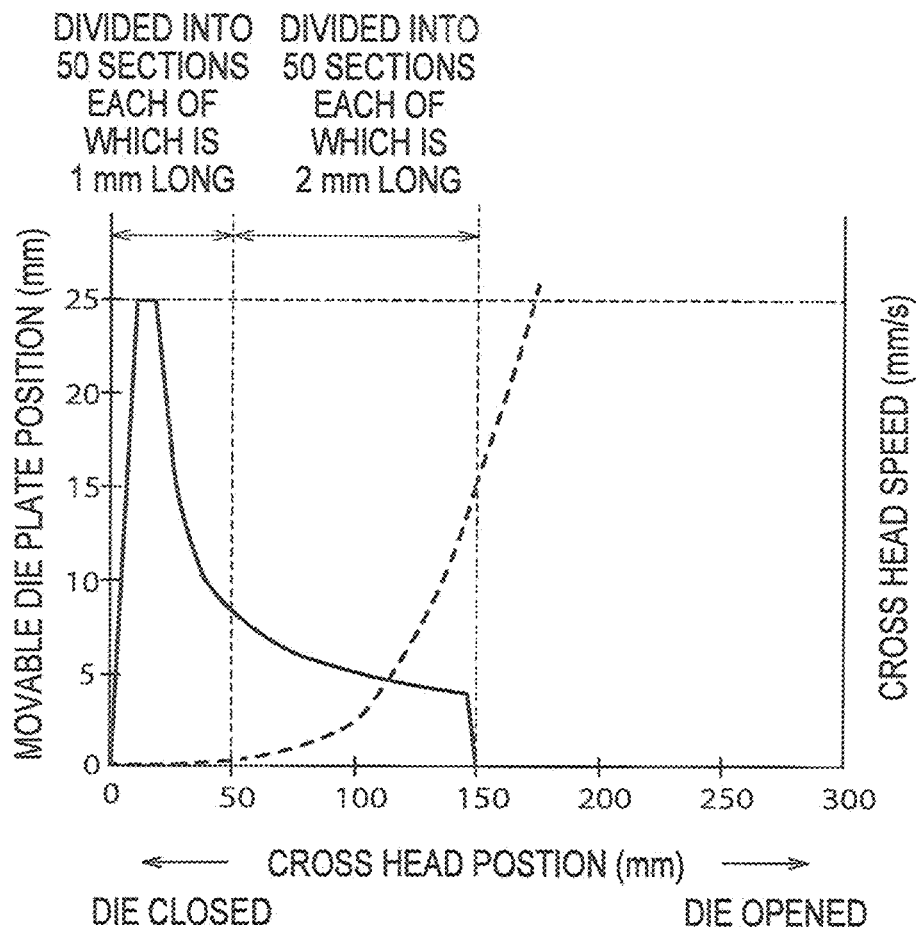
FIG. 4 is a graph illustrating the relationship between the position of a cross head and the position of a movable die plate at the time of core back operation, and the relationship between the position of the cross head and the speed of the cross head.

As shown in FIG. 4, to be assumed will be a case where the movement distance of the cross head 26 at the time of the core back operation is, for example, 150 mm, i.e., a case where the cross head 26 moves by 150 mm from the die closing position. In this case, the movement distance of 150 mm is divided into 100 sections. More specifically, the die closing side position (the region where the position of the cross head 26 ranges from 0 to 50 mm) is divided into 50 sections each of which is 1 mm long, and the die opening side position (the region where the position of the cross head 26 ranges from 50 to 150 mm) is divided into 50 sections each of which is 2 mm long.

In the graph shown in FIG. 4, the horizontal axis indicates the position of the cross head 26, and the left-hand side vertical axis indicates the position of the movable die plate 22. The right-hand side vertical axis indicates the speed of the cross head 26.

In FIG. 4, the dashed line of the graph indicates the relationship between the position of the cross head 26 (the horizontal axis) and the position of the movable die plate 22 (the left-hand side vertical axis). As the cross head 26 moves, the movable die plate 22 also moves; their positional relationship, however, is not linear.

The solid line in the graph indicates the relationship between the position of the cross head 26 (the horizontal axis) and the speed of the cross head 26 (the right-hand side vertical axis) when the movable die plate 22 moves at a fixed speed. In this way, as the cross head moves from the die closing side toward the die opening side, the speed of the cross head 26 is gradually reduced, whereby it is possible to perform control such that the movable die plate 22 moves at a fixed speed. In the case where the position of the cross head 26 is near 0 mm and in the case where the position of the cross head is near 150 mm, the cross head 26 is respectively accelerated and decelerated abruptly, so that the inclination of the graph is steep.

In this way, in the toggle type die clamping device according to the present embodiment, at the time of the core back operation, the control portion 50 controls, the cross head 26 such that the movable die plate 22 moves at a fixed speed. This helps to prevent variation in the speed of the movable die plate 22 during the core back operation, making it possible to make the fine foaming amount of the foam layer of the molding uniforms. As a result, it is possible to improve the quality of the molding.

While in the present embodiment described above the molding apparatus is an injection molding machine, this should not be construed restrictively. For example, the present embodiment is also applicable to other molding apparatuses such as a die cast machine. Further, while in the present embodiment the driving device and the cross head are separate components, the present invention is not restricted to this arrangement. For example, the cross head may constitute a part of the driving device.

The invention claimed is:

1. An opening/closing device comprising:
a stationary platen;
a movable platen capable of moving toward or away from the stationary platen;
an opening/closing mechanism having a plurality of toggle links at least one of which is connected to the movable platen;
a driving device including a cross head connected to at least one of the toggle links and capable of moving the movable platen; and
a control portion configured to control the cross head such that the movable platen moves at a fixed speed during fine die-opening operation,
wherein a cross head movement distance through which the cross head moves at the time of fine die-opening operation is divided into a plurality of sections, with a speed of the cross head being determined beforehand for each of the plurality of the sections such that the moveable platen moves at a fixed speed during the fine die-opening operation,
at the time of the fine die-opening operation, the control portion moves the cross head at the speed determined beforehand for each section, and
in the plurality of sections, a first range of die closing side position along the cross head movement distance includes a first set of successive sections, each of which has the same first length, and a second range of die opening side position along the cross head movement distance includes a second set of successive sections, each of which has the same second length, the first length being shorter than the second length.

2. A molding apparatus comprising an opening/closing device according to claim 1.

3. A molding method employing an opening/closing device according to claim 1, and comprising a step in which, at the time of fine die-opening operation, the cross head is moved such that the movable platen moves at a fixed speed.

4. The opening/closing device of claim 1, wherein each speed of the cross head is determined beforehand for each of the plurality of sections to be different from each other successively such that the movable platen moves at the fixed speed during the fine die-opening operation.

5. The opening/closing device of claim 4, wherein each respective speed of the cross head is determined to be fixed beforehand for each of the plurality of sections through which the cross head moves at the time of the fine die-opening operation.

6. The opening/closing device of claim 1, wherein the cross head movement distance through which the cross head moves at the time of fine die-opening operation includes the first range of the die closing side position and the second range of the die opening side position along the cross head movement distance.

7. The opening/closing device of claim 6, wherein the first range from the die closing side position ranges from 0 to 50 mm and is divided into 50 sections each of 1 mm long.

8. The opening/closing device of claim 6, wherein the second range from the die closing side position ranges from 50 to 150 mm and is divided into 50 sections each of 2 mm long, and wherein the speed of the cross head is gradually reduced during the second range.

* * * * *